July 4, 1939.  H. ROSENBERG  2,165,010
ANCHORAGE APPARATUS
Filed Oct. 23, 1934  2 Sheets-Sheet 2

Inventor:
Heyman Rosenberg
By Edgar M Kitchin,
his Attorney.

Patented July 4, 1939

2,165,010

UNITED STATES PATENT OFFICE 2,165,010

ANCHORAGE APPARATUS

Heyman Rosenberg, New York, N. Y.

Application October 23, 1934, Serial No. 749,644

22 Claims. (Cl. 85—47)

In the anchoring of parts of building structures and other fabrications, it has long been standard practice to employ threaded fasteners and to introduce the same, where they are of the machine screw type, by first forming an internal path or thread by the use of a tap or a succession of taps, and then inserting into such path a machine screw designed and adapted to be received therein, and it has also been standard practice, particularly in wood fabrications, to anchor or connect parts together by inserting a screw and causing it to pull itself into the work by rotating it therein without a previously formed opening or a previously formed internal thread, and since the grant of my Patents Nos. 1,299,232 and 1,809,758, and patents on kindred and related inventions, it has become popular practice to form an opening in metal work and insert a hardened thread screw therein without the previous preparation of an internal path of internal thread, and this practice has proved highly satisfactory. The action of the screw in forming its own path while pulling itself into the metal, regardless of its thread pitch, depth or form, may be compared to a wood screw action rather than a machine screw action, but actually differs from both in the performance of the metal work entered and the great capacity of the resulting anchorage to resist loosening of the screw under vibration of the most severe and persistent kind. Automobile and other transport mechanisms that are subject to great and constant vibration during use do not cause loosening of such screws.

With the smaller and more popular ranges, say from a quarter inch downward to a sixteenth of an inch in diameter or less, no difficulty is experienced in their insertion in properly dimensioned bores formed in solid masses of the harder metals, such as malleable iron and steel, or even the brittle cast iron. But, even with the improvement of the second-mentioned patent, application of such screws into the harder metals where the larger diameters are used involves certain difficulties.

It is of course well known that whenever a screw of this general type is used, a bore or opening must be formed in the mass or block of the work material, which bore has a sufficiently greater diameter than the root diameter of the screw to be inserted to leave clearance in the valleys between the thread helices to accommodate metal of the work extruded by the thread entering the mass of the work. This difference in diameter between that of the bore in the work and that of the body of the screw affords a clearance without which the torsional strain on the screw would have to be sufficient to actually cause the entered metal to be wholly compressed within the body of the mass of the work, an action that can be accomplished with the fasteners of smaller diameters when inserted in highly malleable metal. But a screw as small as three thirty-seconds of an inch in diameter when inserted without clearance into mild steel is liable to offer such resistance to rotation as to be very difficult to be forced in, and with the larger screws it is impossible without suitable clearance. The clearance is, of course, proportional to the sizes, and it is highly desirable to provide such clearance in each instance as will insure at least some compression of the metal work to set up therein a reactive force causing the work to firmly grip the faces of the thread and hold it against vibration loosening.

To limit the torsional stress to which the screw is subject when of the larger diameters sufficiently not to injure the screw or the rotating tool or mechanism, quite a little clearance is needed, especially for screws of a half-inch diameter or larger. Of course, the greater the clearance provided, the less the depth to which the screw thread will enter the work. It is, of course, true that the greater the depth of entry of the thread into the work without injury to the screw or to the work, the stronger the anchorage. It is an object of the present invention to increase the depth to which the thread of such a fastener may enter the harder metals (such as soft iron or soft steel) with substantial facility, no danger of twisting off the screw body, no danger of injury of the tool or rotating machine, and, when hand turned, no such resistance to turning movement as to become exhausting to the operator.

A further object in view is the provision of means for cutting away a part of the metal of the work by the fastener of the present invention without cutting away that amount which would produce a complete thread path, so that enough of the body of the work is left along the line of the thread path outlined by the cutaway portions to require the full depth thread of the fastener to enter the metal work and flow the metal or compress it to complete the path, so that while the introductory movement of the fastener is accomplished with substantially less resistance for any given depth than is experienced when a screw, such as disclosed in my Patent No. 1,809,758 is applied, there is nevertheless a substantial reactive force set up in the metal work against the faces of the entering thread incident to the compression of the work causing gripping or clamping of the thread and thereby effectively retaining the fastener in its seated position in engagement with the work.

As seen in my Patent No. 1,465,148, and in various other patents, flutes or cut-away portions have been employed to cause the thread sections to act somewhat like the cutters of a tap, but where such flutes or cut-away portions extend across a full depth thread, that is a portion of the thread at a helix of maximum diameter, the tendency is to remove so much of the material of the work that the thread path is substantially completed for receiving the thread of the fastener, and little, if any, opportunity is offered for flowing the metal of the work or compressing it to a state having the reactive force mentioned above and desirable to prevent it from vibrating loose after application.

Also, it has been proposed, as shown in my last-named patent and other patents, to provide flutes or grooves by employing cutting or abrading instruments for removing the material to leave such flutes or grooves, but such operations are relatively highly expensive in quantity production and do not provide the character of finished surface which results from flowing the metal of the fastener before it is hardened to the desired shape including the grooves. In my co-pending companion application filed October 23, 1934, Serial No. 749,643, I have illustrated and claimed the production of such grooves by a rolling operation simultaneously with the rolling of the threads on the fastener, and this action in kneading, manipulating, and cold flowing the metal of the fastener body to the grooved condition provides finished walls for the grooves and for the thread terminals along the grooves.

An object of the present invention is provision of a fastener instrument capable of a high degree of efficiency and provided with a cutting groove or grooves formed and located to afford maximum efficiency in reducing the labor of inserting the fastener instrument without destroying its capacity of effective anchorage in work capable of resisting vibration loosening, and a further object is the accomplishment of this result by such an instrument having cutting edges provided by the presence of a groove or grooves produced without cutting action; and a still further object is the highly efficient condition of such cutting edges incident to the production of the grooves by a metal flowing action and a compression of metal of the fastener before it is hardened, such as by having the grooves formed by a rolling operation.

A still further object in view is the provision of a fastener instrument possessing to a high degree at a very low expense characteristics and capacities of a screw-threaded anchorage device and also of a thread-forming tap, so that the instrument may be used either as a screw for anchoring parts together or as a substitute for a tap for preparing a path to receive another anchorage device.

With these and other objects in view as will in part hereinafter become apparent and in part be stated, the invention includes a screw-threaded instrument tapering at its entering end and having a thread portion extending along the tapering portion and interrupted by a groove to produce cutting edges of less outstanding depth than the full depth of the thread while the full depth thread is not provided with such cutting edges.

The invention also comprises a fastener instrument of the threaded type having a groove extending across a portion of the thread and formed in the device by compression and flowing of the material of the device as distinguished from cutting.

The invention also comprises certain other novel constructions, combinations, and arrangements of parts as subsequently specified and claimed.

In the accompanying drawings—

It is well known that taps are highly expensive instruments and that because of the high degree of their tempering or hardening to enable them to function satisfactorily and resist wear they are subject to breakage under comparatively slight strain or with any substantial lack of skill in handling. The present invention contemplates the provision of an effective substitute for such a tap by providing an instrument well adapted for forming an internal thread in work of the harder metals, such as soft iron or soft steel, and in cast iron and even in semi-annealed steel having a somewhat higher carbon and manganese content than the usual stock of soft steel.

Referring to the drawings by numerals, I indicates the body of a fastener instrument embodying the features of the present invention, which body is customarily referred to in shop practice as the root diameter, signifying that diameter measured between lines tangent to the bases of the grooves or valleys between helices of the thread. The body I is formed with a thread 2 which may be of any desired cross section or pitch within the range of screw-threaded fasteners known as machine screws, wood screws, studs, bolts, and the like. In this connection it should be understood that a wood screw essentially differs from a machine screw in the character of the intended use rather than in the details of construction or pitch of the thread, since many machine screws, such as those used for starter gears for internal combustion engines, for lathe spindles, for automatic screw-drivers, and for clamps of various kinds, such as carpenters' clamps and clamps for tennis racket frames, are much higher in pitch than the average pitch of the wood screw, though each of these is uniformly recognized as a machine screw. In other words, the present invention is not directed to the cross section of the thread, or the spacing of its helices, which of course involves its pitch, except that the pitch must be sufficiently low to be reasonably available for use by rotation of the fastener instrument for purposes of application as distinguished from the application of a fastener instrument by direct, axially-delivered stress exemplified in a hammer blow. While the body 1 may be provided with any desired or preferred shape of head, one efficient embodiment omits the head altogether, and in lieu thereof is provided with a polysided socket 3 located axially in its outer or trailing end portion and adapted to be engaged by a correspondingly shaped operating tool 4, which tool affords ample leverage for delivering the desired turning stress to the fastener instrument. The entering or advancing end of the body 1 is tapered to provide a cone 5, which is preferably truncated, but may be otherwise constructed as desired. The thread 2 is extended down along the tapering portion 5 preferably to or substantially to the end thereof in the form of tapering thread helices 6 corresponding generally to the tapered end portion of thread on the tapered body of the fastener seen in my Patent No. 1,827,615, and the thread helices 6 are preferably grooved at 7 along their median line, the groove flaring in the direction of the taper of the thread or tapering in the converse direction so as to flare and fade into the body 1 at the entering end thereof and to taper to the plane of vanishing point at approximately the plane of meeting of the cylindrical portion of the root diameter or body 1 with the cone 5. Intersecting the helices 6 are grooves 8, 8, which are of sufficient depth to extend slightly into the body 1 at the cone 5, each groove 8 terminating at its upper end at the base of the cone 5 short of the first full depth helix of thread 2, thus leaving an unbroken tapered thread expanding section 5x intermediate the lower tap section and the upper full-depth-thread or holding section. Each thread helix at each intersection by a groove 8 presents cutting edges adapted to cut away material engaged by the anchorage instrument, and to facilitate and increase such cutting action each groove 8 is preferably inclined to the major axis of the body 1 to cause the said cutting edges to have a shearing action in the course of rotation of the instrument. Of course, the grooves 8 may be formed without such inclination where the shearing action is not required or desired, but in the preferred embodiment the grooves are thus inclined, and the inclination is preferably equal to the inclination of the tapering sides of the cone 5, so that each groove 8 is parallel or substantially parallel to a line corresponding to the inclined side of the cone 5 seen in elevation, as is obvious from the showing in Figure 1.

The grooves 8 are preferably not formed by an abrading or cutting instrument, but are formed without removal of any of the material of the blank from which the body 1 and its thread 2 are formed, and, to this end, the grooves 8 are preferably produced by being rolled into the instrument as the instrument is being produced by a rolling operation after the manner taught in my co-pending application executed and filed concurrently with the instant application, the disclosure of which co-pending application is incorporated herein by reference so far as required for disclosing the details of rolling the grooves 8 while the thread 2 is being rolled and the other details of the process or art of forming the fastener instrument.

Of course, the grooves 8 may be produced by cutting, but such action is not preferred because there is no kneading of the material and raw edges result, whereas the rolling operation compresses and kneads the material into smoothly finished closely compact condition where the fibres are not severed or presented as a raw edge. Of course, at some considerable additional expense the grooves 8 can be produced without cutting or abrading by a stamping or punching operation, but here again the rolling is preferred as commercially available because of the substantially less expense.

Figures 1, 2, 3, 4, 5, 6:
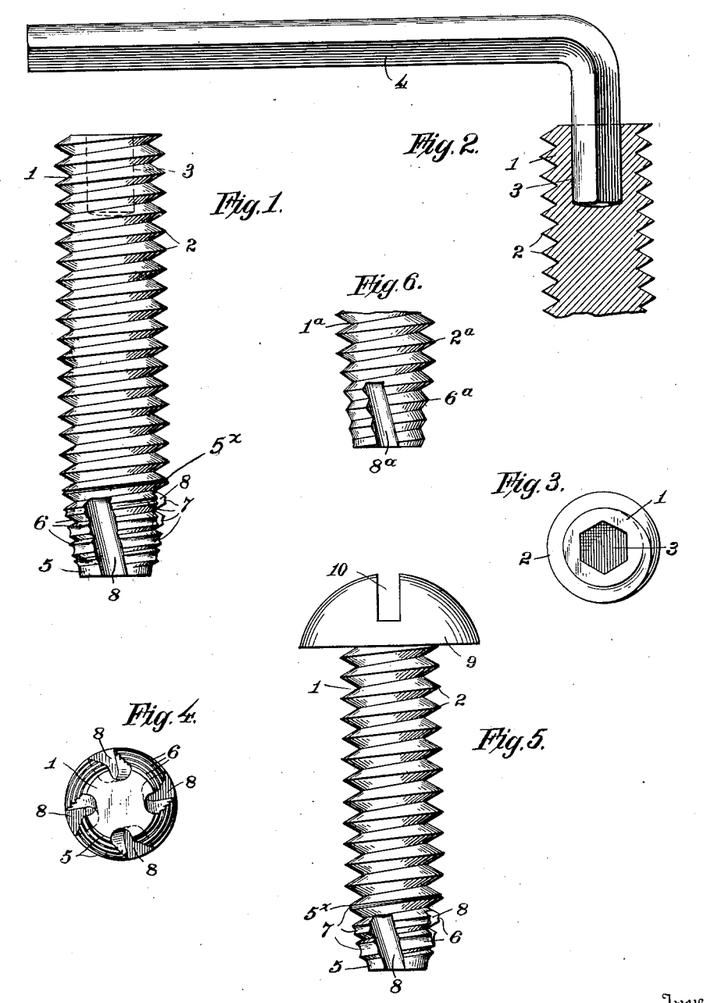
Figure 1 is a view in side elevation of a fastener instrument embodying the features of the present invention, the tool-receiving socket being seen in dotted lines.
Figure 2 is a fragmentary, sectional view of the said fastener instrument with the operating tool shown in elevation applied in its operative position.
Figure 3 is an end view of the outer or trailing end of the fastener instrument.
Figure 4 is an end view of the entering or opposite end thereof.
Figure 5 is a view similar to Figure 1 of a slightly modified embodiment of the invention, the parts being seen on a reduced scale.
Figure 6 is a view in side elevation of the entering end portion of a fastener instrument embodying the invention and having a modified form of tapering thread terminal portion.

In Figure 5 is illustrated a further embodiment of the invention which differs from that above described only in that the head 9 is employed, and, of course, the socket 3 is therefore omitted. Obviously, the head 9 may be given any appropriate shape for receiving a tool and the kerf 10 seen in Figure 5 is but one illustrative instance of tool-receiving means of the head 9. As the balance of the structure seen in Figure 5 is identical with that just above described, the same reference numerals have been applied to the drawing and the same description equally applies.

While four grooves 8 are illustrated as employed by preference in the present improved anchoring instrument, it is obvious of course that the number of grooves may be varied as found desirable to a greater or less number, as shown in the drawings of the said copending application.

The present improved anchorage instrument is constructed as above described preferably of steel or iron and then case-hardened to a condition sufficiently hard for successfully entering the harder metals, such as soft iron or soft steel, steel of the higher carbon and manganese content, and cast iron, substantially without injury, that is without any apparent injury, to the thread 2 and its helices 6 even after repeated use in such metals. Of course, other methods of hardening may be employed, but one preferred method, because of its inexpensiveness and effectiveness, is the well known cyanide hardening by which the fastener, after otherwise being completed, is highly impregnated with carbon and then while at a high temperature, say in the neighborhood of 1600° F., is suddenly quenched in water or oil or other effective quenching liquid. The hardening operation is preferably carried out after the manner disclosed in any of my Patents Nos. 1,786,508; 1,806,503, and 1,834,872, and their companion patents and co-pending applications not yet patented, or by any other acceptable art or process whereby the threads 2 with their helices 6 are conditioned to withstand the strain and wear of introduction into the harder metals, and also to withstand repeated introductions therein.

Thus, the anchorage instrument is well adapted for use either as a threaded fastener for anchorage in the harder metals, or for an anchorage device or fastener for permanently and dependably connecting two parts of such metal work together, or for forming internal threads in such work to receive screws having a thread formation corresponding to the full depth thread 2. Hence, the present improved anchorage instrument is not only a screw-threaded fastener, but is also a very inexpensive and efficient substitute for a tap, capable of being used somewhat as a tap, removed, and subsequently repeatedly used to be followed by the insertion of the properly threaded screw. The action of the present improved screw, or fastener instrument, is, of course, not that of the true or actual action of a tap because it does not provide for any clearance for the thread of the screw that is to be inserted, and this is true even of the embodiment seen in Figure 8, and hereinafter described. Of course, a true tapping action always provides a thread path slightly larger than the thread of the machine screw that is to be introduced into it. Even a body fit tapping operation does not contemplate such snug contact as results from use of the present improved fastener instrument.

When the present improved fastener instrument is first introduced into work, the operation preferably consists in providing a bore or passageway in the metal of the work corresponding generally to but slightly greater than the root diameter of the fastener. In fact, ordinarily, unless the metal is especially ductile and susceptible to compression, and the fastener instrument is of small size, a certain amount of clearance between the walls of the bore prepared in the work and the root diameter 1 must be afforded, and the bore is thus originally made proportionally larger in cross section than the cross section of the body 1. Of course, the bore is of less cross section or diameter than the diameter measured from a line tangent to the outstanding edges of thread 2 at one side to a corresponding line at the other side of the full depth thread, so that the thread will have an opportunity to enter the metal of the work. In fact, the bore is preferably of a diameter small enough to allow at least some portions of the thread part 6 to engage the surrounding wall and to exert a draw or pull tending to force the anchorage instrument into the work incident to rotation of such instrument. The action of the thread portion 6 is largely that of the correspondingly grooved portions of thread of my Patents Nos. 1,809,758 and 1,827,615 modified however by the action of the cutting edges incident to the presence of the grooves 8, which cutting edges cut away and remove chips or particles of material of the surrounding work so that the thread 2 when reached at the base of the cone 5 does not have to compress and flow away the whole or any very substantial portion of the mass of the metal work to be entered. Such whole mass must be flowed with the insertion of the screw of my Patents Nos. 1,809,758 and 1,837,615, but instead the full depth thread 2 merely flows away and compresses a comparatively small amount of the metal work to form a thread path for itself, but the amount thus compressed and flowed away by thread 2 is sufficient to smooth off the surface of the engaged work and eliminate any raw edges thereof, and is also enough to create a reactive force in the surrounding metal work tending to resist entrance and exit of the thread and to clamp the thread wherever it happens to be left. Thus, the capacity to resist vibration loosening by the present improved fastener instrument when seated in work is similar in princple, though somewhat less in actual effect, to the screws of my Patent No. 1,809,758 or my Patent No. 1,827,615 when seated in work according to the teachings of those patents. However, the resistance to the entrance of the present improved fastener instrument to its engaged position is less than said patented screws, while resistance to loosening is ample for permanent and dependable connection. The reduction in resistance to entry of thread 2 is due to the removal of some of the material, and has the highly valuable effect of enabling the present improved anchorage instrument to enter ordinary soft iron or soft steel to a greater depth than can be done and with a less clearance between the surrounding work and the root diameter than is possible with the fasteners of the last-named patents. This results, in practice, in enabling use with facility of screws embodying the present invention of larger ranges of diameter. For example, screws one-half, three-quarter, and one inch in diameter and larger are being highly successfully used in structural iron and steel work, such as building framing and the like.

Repeated demonstrations have proved that the present improved anchorage instrument is capable of readily entering the most brittle of cast iron quite effectively so as to produce a highly satisfactory anchorage therein or connection thereto without any previous tapping of other treatment of such metal outside of the formation of the requisite bore.

Determination of the proper bore for any work can be readily, sufficiently, definitely determined and fixed by a very simple test, though each different size of screw and each different material of the harder metals may and frequently preferably does require a bore and clearance specifically of its own to give the very best and most highly satisfactory results. In case of doubt, it is wise to give preference, when using the larger sizes of fasteners, to a slightly too large rather than too small bore, as a too small bore is liable to result in twisting the fastener in two while endeavoring to insert it. If the bore is entirely too large, the great ease of insertion will warn the operator of the fact, and if the bore is larger than actually required but small enough for successful use, the resistance to entry will indicate that the anchorage is sufficient and may be dependent upon. The ideal diameter of bore is that which will, while permitting the screw to enter at the same time, cause the material of the work that enters the spaces or valleys between thread helices approximately to fill such valleys. But innumerable tests have proved that this ideal result is in no sense a prerequisite for success. Many of the present improved fastener instruments have stood up under the most severe and gruelling tests of vibration and separation stresses without loosening or giving, and yet which, when cross-cut by emery-wheel grinding (the fastener is too hard to be cut by the average hack-saw), have been found to have the thread valleys not only not filled but in some instances filled only to a comparatively small extent. The objection to too little filling of the thread valleys is largely because of the resulting strain localized in the outer or free edge portions of thread 2, which should be relieved as much as reasonably possible by employing a thicker screw in the given bore or by employing a smaller bore for the given screw. Because of the wide range of successful use of this type of screw with bores of different diameters, and the desirability of at least approximately proper proportioning of the bore to the screw, a schedule of proper proportions, throughout the range of sizes of screws manufactured by me, has been prepared from scientifically conducted tests and measurements as above indicated, and such schedule is regularly furnished to customers. Yet without this scientific aid and merely from the rule of thumb above suggested of being governed by the resistance to entry of the screw, workmen readily become skilled in employing the proper sizes for the best results, and efficient and satisfactory results are obtained without previous skill or experience.

Figure 7:
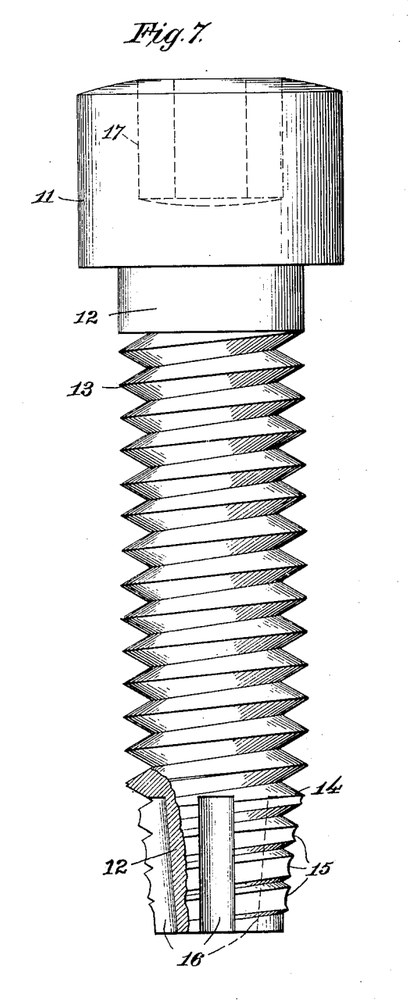
Figure 7 is a view similar to Figure 1 of a further embodiment, the parts being seen on a larger scale.

It will be noted that each of the grooves 8 is of uniform and full depth throughout its length, as seen in Figure 4, and also in Figure 7, and the groove extending into the body of the fastener provides a pocket of ample size to accommodate chips and other cuttings severed from the surrounding work by the cutting edges at the ends of thread 6. Thus such cuttings do not enter the valley of the full depth thread 2, or in fact of any part of the thread. Accordingly, such cuttings do not clog or otherwise interfere with the action of the thread in forming a thread path in the surrounding metal work. Not only is the present improved device an effective screw or bolt or like threaded fastener, but it is also well adapted, especially in emergency instances, for use by mechanics as a substitute for a tap to form an internal thread for the introduction of a screw or bolt of the commercial types now popularly used and usually formed of soft iron or soft steel. It is only necessary to back out by reverse rotation the present improved instrument to enable the insertion of an ordinary commercial screw, and the present improved instrument is then ready for another operation. The snug fit of the internal thread against the faces of the thread 2 which resists vibration loosening or other accidental or undesirable shifting of the present improved anchorage instrument does not prevent forcible withdrawal and does not preclude insertion of a commercial screw, but does give the commercial screw a sufficiently snug fit to materially assist in retaining such screw against vibration loosening or accidental withdrawal when the commercial screw is substituted for the present improved device. Accordingly, the present improved anchorage instrument is, in fact, at one and the same time both a screw-threaded fastener and an available substitute for a tap, and can be used as either at will.

Production of grooves 8 by rolling when the threads are rolled has the advantage of cleaning the grooves and the threads of all burrs or extruded material, so that an efficient, clean and perfect or substantially perfect within the needed requirements is produced at a cost far below the cost of fasteners having a groove or grooves cut or formed therein before or after the rolling operation. The cost of production is thus rendered sufficiently low to enable fastener instruments embodying the present invention to be marketed at the same or substantially the same price as case-hardened rolled thread screws. Hence these improved screws, which are herein mentioned as "fastener instruments" to indicate their available use both as screws and as substitutes for taps, are, in fact, designed and well adapted for popular use as permanent fasteners for every kind of metal fabrication. The smaller sizes of the fasteners of the present invention are highly efficient for and extensively used in automobiles and airplanes, boats, ships, and other transport apparatus and elsewhere where vibration in use is practically incessant, but the fasteners do not loosen thereunder.

It will be noted that in the preferred embodiment the tapering portion 6 tapers in outstanding depth of thread but not in width of thread, and that the groove 7, where present, tapers conversely to the taper of the thread, but tapers both in width and in depth from the entering end of the thread to the vanishing point of the groove, but this grooved formation is by no means indispensable for successful use of the invention. A plain thread, as seen in Figure 6, has also been found satisfactory where used as part of the present invention.

In Figure 6 is illustrated an embodiment of the present improved fastener instrument in which the parts are identical with those seen in the lower portions of the fasteners of Figures 1 to 5 inclusive except that the groove in the tapering thread is omitted, a condition that is brought about by employing a die similar to that used for the screws of the other figures except that that edge portion of the die corresponding to the leading or entering end of the fastener is not flat but inclined toward the face of the opposing die sufficiently to correspond to the taper of the entering portion of the blank being rolled, the die being provided with the necessary tapering ridges to produce the desired tapering thread on the tapering entering end portion. In Figure 6, 1a indicates the body of the screw or fastener instrument having the full depth thread 2a and at the entering end portion having the tapering thread 6a tapering to the vanishing point in the body of the screw. Grooves 8a are formed, as by rolling or stamping, in the tapering portion of the fastener, and as many of such grooves are provided as desired. The structure of Figure 6, therefore, aside from the groove 7 of the structure seen in Figure 1, corresponds identically with the latter structure with the further exception that a less number than four grooves corresponding to the groove 8 is indicated. The operation of the fastener of Figure 6 is substantially the same as that described with respect to the fastener seen in Figure 1, differing therefrom in two respects, one of which is that the tapered thread 6a does not as readily engage and afford a "draw" under rotation and without appreciable axial thrust as do the thread helices 6. The other difference is incident to the fact that the cutting edges presented by the ends of the thread sections 6a are complete and not interrupted by the groove, and, therefore, cut-away a greater quantity of material of the surrounding work incident to any given movement than will be accomplished by a corresponding movement of thread 6. Accordingly, the structure seen in Figure 6 is inserted with the necessary exercise of a little greater effort or power application, but after insertion effects anchorage in substantially the same way and with substantially the same efficiency.

In Figure 7 is illustrated a fastener incorporating a further embodiment of the invention, differing from Figure 1 chiefly in the fact that the grooves in the entering end portion are not inclined but extend in the general direction of the length of the fastener, and, but for their pitch incident to the taper of the entering end portion of the fastener would be parallel to the major axis of the fastener. This location of the grooves eliminates, or largely eliminates, shearing action and requires the cutting edges to cut away the material of the work by direct thrust. Referring to Figure 7 by numerals, 11 indicates the head of a bolt or like screw 12 having the full depth threads 13 and the tapering thread portion 14 at the entering end of the fastener. The tapering section 14 of the thread is formed with the longitudinal groove 15, and the tapering portion of the fastener is also provided with the grooves 16, 16, extending generally lengthwise of the fastener and intersecting the thread section 14. There may, of course, be as many grooves 16 as desired, and four are indicated in Figure 7. They preferably terminate short of the upper extremity of the tapering thread portion 14 so as to leave material of work entered that must be flowed away by the advancing thread to provide a thread path of sufficient cross section to accommodate the full depth thread section 13. It will be noted that the grooves 16, which correspond to grooves 8, are, like grooves 8, of substantial depth in the body 12 and are of uniform depth throughout their length so as to provide a pocket in which chips and cuttings may be deposited and thereby prevented from clogging in the oncoming threads, and interfering with the ready and effective operation thereof. The tapered thread portion 14 corresponds with the portion 6 of Figure 1, and the groove 15 corresponds with the groove 7 thereof. The head 11 may have any appropriate tool-receiving means, such, for instance, as the socket 17 corresponding in contour and function to the socket 3.

As the operation of the structure seen in Figure 7 is practically identical with that above described with respect to Figure 1, except for the difference in the omission of the shearing action, a further description of the operation would be repetition. Of course, the grooves 16 may be pitched similarly to the pitch of groove 8, or otherwise inclined rather than arranged straight as seen.

Figure 8:
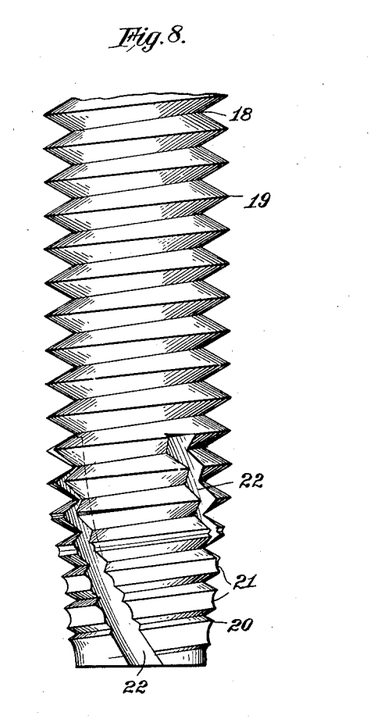
Figure 8 is a view similar to Figure 6 of a still further embodiment.

In Figure 8 is shown the body portion 18 of the screw embodying features of the present invention and having full depth threads 19 and a tapering leading end portion or entering end formed with a thread section 20 continuous of the thread 19 and corresponding to thread section 6 of Figure 1. The thread section 20 tapers to blending in the tapered body 18 at its entering end, and is provided with a median groove 21 conversely tapering and corresponding to the groove 7 of Figure 1. Grooves 22 are rolled in the body 18 and are similar to groove 8, except that they are extended beyond the tapering section thread and intersect at least one full depth thread. Each groove 22 is otherwise the same as a groove 8, being of uniform width and depth and functioning the same for entrance of the screw to the helix just above the last helix intersected by grooves 8. In applying the screw 18 after reaching the point just stated, continuous rotation of the screw will continue the cutting action until the full depth thread also functions with its cutting edges produced by grooves 22 to cut away material of the surrounding work and thereby produce a groove or internal thread or thread path to receive the thread 19 of practically the same cross section as the thread 19. When this structure is used, the full depth thread does not act to flow any appreciable or measurable quantity of material out of its path as it approaches, since such material has already been cut away, but as the cutting edges produced by the intersection of full depth threads by grooves 22 are of no greater proportions than the corresponding parts of the full depth thread 19, there is no excess material removed and no clearance provided as occurs in the use of a tap preparing for the insertion of a machine screw. Thus, the introduction of the fastener 18 while providing a substantially full depth thread path actually provides a thread path very snugly fitting the full depth threads 19 and thereby largely eliminating loosening under vibration. It is important to note that the grooves 22 are not produced by cutting away, abrading, or otherwise severing material from the fastener blank, but by compressing the material into the body of the blank and into the surrounding threads, so that the surfaces of the grooves 22 and the resulting edges on the ends of the thread section 20 are smoothed off free from burrs and having that increased density incident to compression of the metal. Also, the fiber of the metal has not been cut and the parts thus acted upon produce the grooves 22 in that superior condition above indicated over a groove formed by cutting and removing material.

It will be noted that Figures 7 and 8 are substantially on enlarged scales relative to the other figures of the drawings, and for the popular sizes of fasteners show exaggerated structures for clearness of detail; but the structures shown in Figures 7 and 8 are not exaggerated beyond the available sizes of fasteners embodying the present invention. For fabrication of metallic structures that are not subject to appreciable vibration, the fastener of Figure 8 is entirely satisfactory, and the fasteners of the several other figures are highly satisfactory for use in structures subject to a very substantial amount of continuous vibration. The range of sizes varies according to use, and the present invention is particularly valuable with the larger sizes of fasteners intended to take the place of rivets, bolts, and machine screws and accomplish the work at less expense and more efficiently. One of the reasons why the present invention is more efficient than a bolt or machine screw is the fact that when a group of machine screws or bolts is applied to hold parts together, it is not practicable, and probably not possible, to tighten each to exactly the same extent that the others are tightened. The tightest one of the group therefore is likely to carry more than its proportional share of the load to the point where it breaks or weakens and thus shifts the load to the next higher bolt which must carry in consequence a disproportionate load. This process of over-straining successive bolts may continue throughout the whole group without any two of them at any time equally sharing the load until the entire fastening is thoroughly weakened even to the shearing point because of this unbalanced condition. Catastrophes and disasters have occurred owing to this problem of structural engineering, and at least one great theater disaster in the city of Washington was found to be due at least in part to this condition. One of the important advantages of the present invention is its capacity to provide screw-threaded fasteners as substitutes for machine screws and bolts which do not have the defect just indicated. Every fastener embodying the present invention has such a fit in the engaged work and creates such reactive force in the surrounding metal that each fastener carries its full and substantially equal share of load continuously from the time of its insertion. No shifting of the load and no possibility of successive weakening of fasteners can or does therefore occur. While the structure seen in Figure 8 is the nearest approach to the possibility of the objectionable, non-equal load distribution, the intimacy of contact of its engagement is at least as perfect, and usually more perfect, than a bolt having a body fit that largely, if not wholly, eliminates the objection indicated. Of course, the body-fit bolts represent very substantial expense compared with the relatively trivial expense of provision and application of a fastener incorporating the present invention.

Reference herein to sizes and size ranges is only illustrative and in no sense restrictive, since, so far as downward limit is known, the invention has proven successful as applied to the smallest sizes capable of being produced by rolled-thread screw machines, so small as to be substantially microscopic in details. As to the upward limit, the largest possible size has not been determined, if there is an upper limit. All market demands for all sizes of screw-threaded fasteners have been successfully supplied, and if there is an upward limit, it will doubtless be found to be in common with all of the well known rolled screws heretofore popularly on the market.

It will be noted that each of the hardened fasteners disclosed herein, except the fastener of Figure 8, includes—

1. A tapering, threaded portion at its entering end intersected by cutting grooves;
2. A larger, tapering threaded portion above the cutting grooves, having an uninterrupted, expanding thread for deforming and stressing the work material; and
3. A threaded body portion of uniform diameter and having a uniform thread formation for interfitting with the thread formed in the work, maintaining the work material in a stressed condition, and thereby effecting a strong, vibration resisting anchorage.

All forms have in common the features that they are hardened, rolled thread fasteners, and that they include tapered and non-tapered threaded portions, the former intersected by rolled grooves to form cutting shoulders.

What is claimed is:

1. A threaded fastener of hardened steel adapted to be driven into a bore in iron or steel having a diameter at least as great as the root diameter of the fastener, said fastener including a body, a full depth thread portion on the body of substantially uniform diameter for engaging the work to hold the fastener in place when the fastener is driven home, and a tapered thread portion which increases gradually in diameter through several turns from substantially the root diameter of the fastener to substantially the diameter of the full depth thread, said tapered thread portion comprising a tap section at the smaller end which is intersected by grooves to form a series of cutting faces of progressively increasing height for progressively cutting a thread in the work, and an upper uninterrupted thread expanding section of substantial length for deforming the work material and stressing it progressively to enable the full depth fastener threads to enter the internal thread and hold the walls of the internal thread stressed apart when the fastener is fully applied.

2. A threaded fastener of hardened steel adapted to be driven into a bore in iron or steel having a diameter at least as great as the root diameter of the fastener, said fastener including a body, a full depth thread portion on the body of substantially uniform diameter, and a tapered thread portion which increases gradually in diameter from substantially the root diameter to substantially the diameter of the full depth thread, said tapered thread portion having its thread extending uninterruptedly for a substantial distance at the larger end and having its thread interrupted by transverse grooves at the smaller end to provide thread cutting shoulders of progressively increasing height, the broken thread sections and the cutting shoulders having the characteristics of compactness and smoothness produced by repeatedly subjecting the same parts alternately to thread pressing and groove pressing operations.

3. A threaded fastener of hardened steel adapted to be driven into a bore in iron or steel having a diameter at least as great as the root diameter of the fastener, said fastener including a body, a full depth thread portion on the body of substantially uniform diameter, and a tapered thread portion which increases gradually in diameter from substantially the root diameter to substantially the diameter of the full depth thread, said tapered thread portion having its thread extending uninterruptedly for a substantial distance at the larger end and having its thread interrupted by transverse grooves at the smaller end to provide thread cutting shoulders of progressively increasing height, each thread segment between successive grooves being so formed that it has substantially its maximum height at its leading or cutting edge.

4. A threaded fastener of hardened steel adapted to be driven into a bore in iron or steel having a diameter at least as great as the root diameter of the fastener, said fastener including a body, a full depth thread portion on the body of substantially uniform diameter for engaging the work to hold the fastener in place when the fastener is driven home, and a tapered thread portion which increases gradually in diameter through several turns from substantially the root diameter of the fastener to substantially the diameter of the full depth thread, said tapered thread portion comprising a tap section at the smaller end which is intersected by grooves to form a series of cutting faces of progressively increasing height for progressively cutting a thread in the work, and an upper uninterrupted thread expanding section of substantial length for deforming the work material and stressing it progressively to enable the full depth fastener threads to enter the internal thread and hold the walls of the internal thread stressed apart when the fastener is fully applied, the taper of the tapered thread portion being so slight that the fastener can tap and expand the internal thread and can be started easily and without substantial canting.

5. A threaded fastener of hardened steel adapted to be driven into a bore in iron or steel having a diameter at least as great as the root diameter of the fastener, said fastener including a body, a full depth thread portion on the body of substantially uniform diameter for engaging the work to hold the fastener in place when the fastener is driven home, and a tapered thread portion which increases gradually in diameter through several turns from substantially the root diameter of the fastener to substantially the diameter of the full depth thread, said tapered thread portion comprising a tap section at the smaller end which is intersected by grooves to form a series of cutting faces of progressively increasing height for progressively cutting a thread in the work, and an upper uninterrupted thread expanding section of substantial length for deforming the work material and stressing it progressively to enable the full depth fastener threads to enter the internal thread and hold the walls of the internal thread stressed apart when the fastener is fully applied, the grooves being formed with rounded leading shoulders and abrupt trailing shoulders, the latter shoulders forming the cutting edges.

6. A threaded fastener of hardened steel adapted to be driven into a bore in iron or steel having a diameter at least as great as the root diameter of the fastener, said fastener including a body, a full depth thread portion on the body of substantially uniform diameter for engaging the work to hold the fastener in place when the fastener is driven home, and a tapered thread portion which increases gradually in diameter through several turns from substantially the root diameter of the fastener to substantially the diameter of the full depth thread, said tapered thread portion comprising a tap section at the smaller end which is intersected by grooves to form a series of cutting faces of progressively increasing height for progressively cutting a thread in the work, and an upper uninterrupted thread expanding section of substantial length for deforming the work material and stressing it progressively to enable the full depth fastener threads to enter the internal thread and hold the walls of the internal thread stressed apart when the fastener is fully applied, the grooves being deep enough to extend through the thread and into the body of the fastener.

7. A threaded fastener of hardened steel adapted to be driven into a bore in iron or steel having a diameter at least as great as the root diameter of the fastener, said fastener including a body, a full depth thread portion on the body of substantially uniform diameter for engaging the work to hold the fastener in place when the fastener is driven home, and a tapered thread portion which increases gradually in diameter through several turns from substantially the root diameter of the fastener to substantially the diameter of the full depth thread, said tapered thread portion comprising a tap section at the smaller end which is intersected by grooves to form a series of cutting faces of progressively increasing height for progressively cutting a thread in the work, and an upper uninterrupted thread expanding section of substantial length for deforming the work material and stressing it progressively to enable the full depth fastener threads to enter the internal thread and hold the walls of the internal thread stressed apart when the fastener is fully applied, the broken thread sections and the cutting shoulders having the characteristics of compactness and smoothness incident to the thread and grooves being simultaneously rolled into the fastener.

8. A tapping screw comprising a body and a thread thereon tapering at the entering end of the body, the thread being intersected by grooves extending along the body across the thread to provide abrupt cutting shoulders and having the material of the thread and body along the surface of the grooves compressed and kneaded as by formation of the grooves by stamping or rolling.

9. A screw-threaded anchorage instrument comprising a non-tapering threaded body having a tapering entering thread portion, the tapering thread portion being formed with a groove intersecting the threads thereof to form abrupt cutting shoulders and terminating short of the non-tapering threaded portion, and the thread portions being sufficiently hardened for entering the harder metals substantially without injury to the thread.

10. A screw-threaded anchorage instrument comprising a non-tapering threaded body portion having a tapering entering thread portion, the tapering thread portion being formed with a plurality of grooves intersecting the threads thereof to form abrupt cutting shoulders and terminating short of the non-tapering thread portion, and the thread portions being sufficiently hardened for entering the harder metals substantially without injury to the thread.

11. An anchorage instrument as claimed in claim 10 wherein the tapering thread portion is grooved longitudinally and circumferentially of the thread helices.

12. An anchorage instrument comprising a body and a thread thereon tapering at the entering end of the body, the thread being intersected by grooves extending along and within the material of the body for a portion of the tapered part of the thread to form abrupt cutting shoulders and chip pockets and terminating short of the full length of said tapered part, the thread being hardened sufficiently for entering the harder metals substantially without injury to the thread.

13. An anchorage instrument comprising a body and a thread thereon tapering at the entering end of the body, the thread being intersected by grooves extending along the body across the thread to provide abrupt cutting shoulders and having the material of the thread and body along the surface of the grooves compressed and kneaded as by formation of the grooves by stamping or rolling, and the thread being hardened sufficiently for entering the harder metals substantially without injury to the thread.

14. An anchorage instrument comprising a substantially cylindrical body having a non-tapering full depth outstanding thread extending along the body, and the thread extending from the full depth along the entering end portion of the body with regularly diminishing depth to substantially the entering end of the body, and portions of the diminished depth thread being intersected to provide cutting edges, and the surfaces of the thread at the cutting edges being more compact than other portions of the body, as by being compressed and intersected by a rolling or stamping operation, and the thread being hardened sufficiently for entering the harder metals substantially without injury to the thread.

15. A threaded fastener of hardened steel adapted to be driven into a bore in iron or steel having a diameter at least as great as the root diameter of the fastener, said fastener including a body, a full depth thread portion on the body of substantially uniform diameter for engaging the work to hold the fastener in place when the fastener is driven home, and a tapered thread portion which increases gradually in diameter through several turns from substantially the root diameter of the fastener to substantially the diameter of the full depth thread, said tapered thread portion comprising a tap section at the smaller end which is intersected by grooves to form a series of cutting faces of progressively increasing height for progressively cutting a thread in the work, and an upper uninterrupted thread expanding section of effective length for deforming the work metal and stressing it progressively to enable the full depth fastener threads to enter the internal thread and hold the walls of the internal thread stressed apart when the fastener is fully applied.

16. A threaded fastener of hardened steel adapted to be driven into a bore in iron or steel having a diameter at least as great as the root diameter of the fastener, said fastener including a body, a full depth thread portion on the body of substantially uniform diameter, and a tapered thread portion which increases gradually in diameter from substantially the root diameter to substantially the diameter of the full depth thread, said tapered thread portion having its thread extending uninterruptedly for an effective distance at the larger end and having its thread interrupted by transverse grooves at the smaller end to provide thread cutting shoulders of progressively increasing height, the broken thread sections and the cutting shoulders having the characteristics of compactness and smoothness produced by repeatedly subjecting the same parts alternately to thread pressing and groove pressing operations.

17. A threaded fastener of hardened steel adapted to be driven into a bore in iron or steel having a diameter at least as great as the root diameter of the fastener, said fastener including a body, a full depth thread portion on the body of substantially uniform diameter, and a tapered thread portion which increases gradually in diameter from substantially the root diameter to substantially the diameter of the full depth thread, said tapered thread portion having its thread extending uninterruptedly for an effective distance at the larger end and having its thread interrupted by transverse grooves at the smaller end to provide thread cutting shoulders of progressively increasing height, each thread segment between successive grooves being so formed that it has substantially its maximum height at its leading or cutting edge.

18. A threaded fastener of hardened steel adapted to be driven into a bore in iron or steel having a diameter at least as great as the root diameter of the fastener, said fastener including a body, a full depth thread portion on the body of substantially uniform diameter for engaging the work to hold the fastener in place when the fastener is driven home, and a tapered thread portion which increases gradually in diameter through several turns from substantially the root diameter of the fastener to substantially the diameter of the full depth thread, said tapered thread portion comprising a tap section at the smaller end which is intersected by grooves to form a series of cutting faces of progressively increasing height for progressively cutting a thread in the work, and an upper uninterrupted thread expanding section of effective length for deforming the work metal and stressing it progressively to enable the full depth fastener threads to enter the internal thread and hold the walls of the internal thread stressed apart when the fastener is fully applied, the taper of the tapered thread portion being so slight that the fastener can tap and expand the internal thread and can be started easily and without substantial canting.

19. A threaded fastener of hardened steel adapted to be driven into a bore in iron or steel having a diameter at least as great as the root diameter of the fastener, said fastener including a body, a full depth thread portion on the body of substantially uniform diameter for engaging the work to hold the fastener in place when the fastener is driven home, and a tapered thread portion which increases gradually in diameter through several turns from substantially the root diameter of the fastener to substantially the diameter of the full depth thread, said tapered thread portion comprising a tap section at the smaller end which is intersected by grooves to form a series of cutting faces of progressively increasing height for progressively cutting a thread in the work, and an upper uninterrupted thread expanding section of effective length for deforming the work metal and stressing it progressively to enable the full depth fastener threads to enter the internal thread and hold the walls of the internal thread stressed apart when the fastener is fully applied, the grooves being deep enough to extend through the thread and into the body of the fastener.

20. A threaded fastener of hardened steel adapted to be driven into a bore in iron or steel having a diameter at least as great as the root diameter of the fastener, said fastener including a body, a full depth thread portion on the body of substantially uniform diameter for engaging the work to hold the fastener in place when the fastener is driven home, and a tapered thread portion which increases gradually in diameter through several turns from substantially the root diameter of the fastener to substantially the diameter of the full depth thread, said tapered thread portion comprising a tap section at the smaller end which is intersected by grooves to form a series of cutting faces of progressively increasing height for progressively cutting a thread in the work, and an upper uninterrupted thread expanding section of effective length for deforming the work metal and stressing it progressively to enable the full depth fastener threads to enter the internal thread and hold the walls of the internal thread stressed apart when the fastener is fully applied, the broken thread sections and the cutting shoulders having the characteristics of compactness and smoothness incident to the thread and grooves being simultaneously rolled into the fastener.

21. A combined tap and threaded fastener of the class described comprising a body having a threaded holding section at its upper portion and a tap section at its entering end, said tap section having cutting elements adapted to remove a portion of the work material from the thread path of the threads of the holding section to an extent that said thread path presents a diameter slightly less than the diameter of the full threads but substantially greater than the root diameter, the uncut thread path material being expanded by said holding section threads into frictional, gripping position relative to said holding section threads when the fastener is driven home in the work.

22. A combined tap and threaded fastener of the class described comprising a body having full depth threads thereon at one end constituting a holding section, and a tap section at its entering end having cutting and compressing threads thereon of a diameter less than the diameter of the thread of the holding section and greater than the root diameter of said holding section.

HEYMAN ROSENBERG.